No. 795,935. PATENTED AUG. 1, 1905.
T. READING & A. J. HOUGHTON.
PISTON PACKING.
APPLICATION FILED NOV. 14, 1904.
2 SHEETS—SHEET 1.
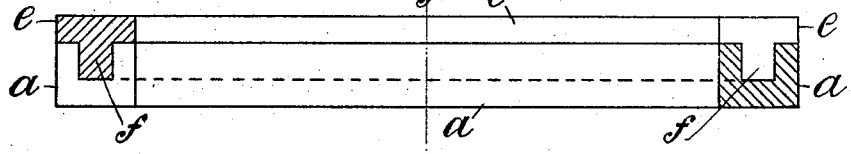
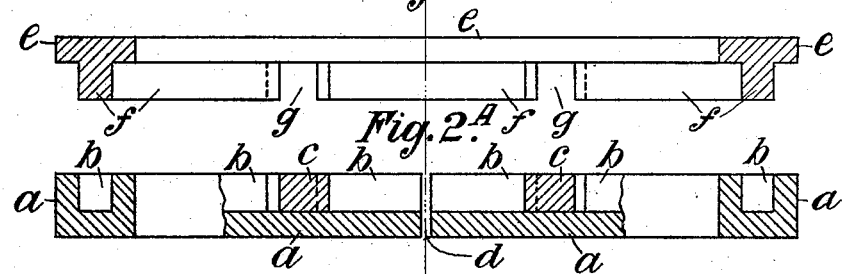
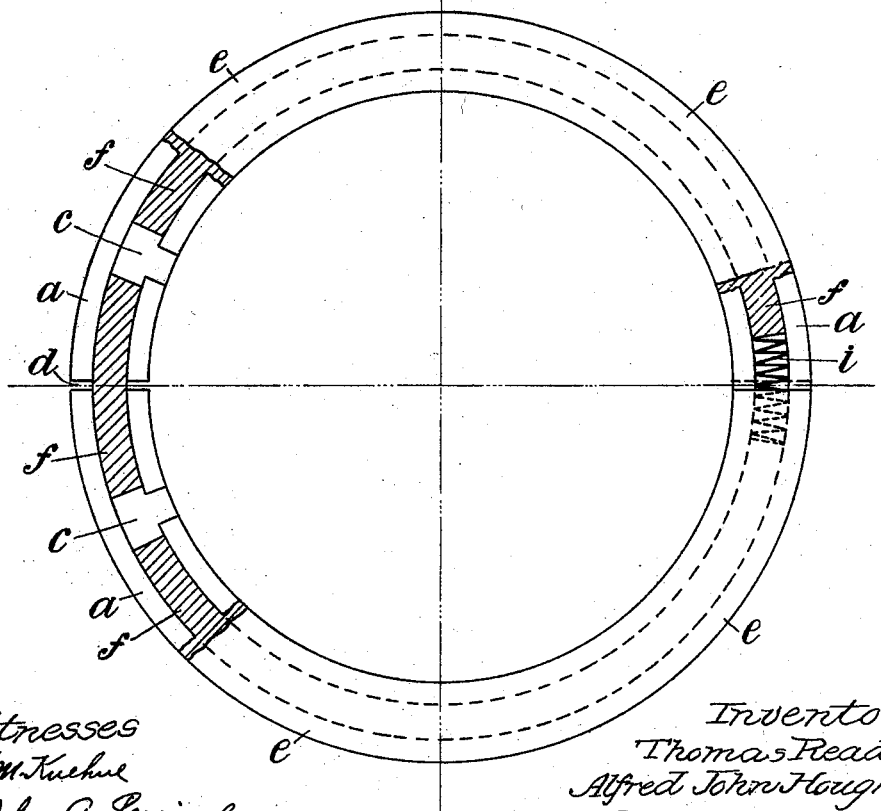
Witnesses
H. M. Kuehne
John A. Percival.
Inventors
Thomas Reading
Alfred John Houghton

No. 795,935. PATENTED AUG. 1, 1905.
T. READING & A. J. HOUGHTON.
PISTON PACKING.
APPLICATION FILED NOV. 14, 1904.
2 SHEETS—SHEET 2.
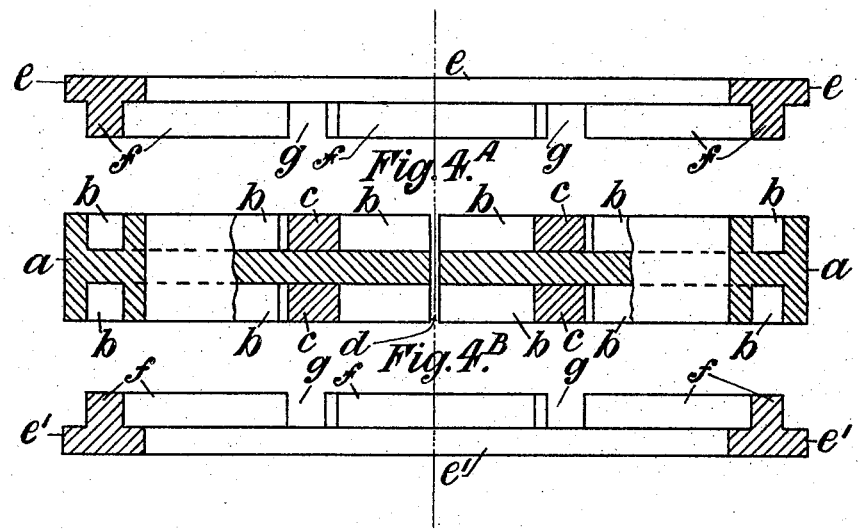

UNITED STATES PATENT OFFICE.

THOMAS READING AND ALFRED JOHN HOUGHTON, OF BIRKENHEAD, ENGLAND.

PISTON-PACKING.

No. 795,935. Specification of Letters Patent. Patented Aug. 1, 1905.

Application filed November 14, 1904. Serial No. 232,662.

*To all whom it may concern:*

Be it known that we, THOMAS READING and ALFRED JOHN HOUGHTON, subjects of the King of England, residing at Birkenhead, in the county of Chester, England, have invented new and useful Improvements in Piston-Packing, of which the following is a specification.

The object of this invention is primarily to make and apply metallic packing-rings of pistons, piston-valves, and the like in such a manner that the friction on the surfaces they engage with will be reduced to a minimum, while at the same time produce a steam or fluid tight joint, and according to this invention a complete packing-ring is made up of two rings, one of which is provided with an annular groove at one side and the other is provided with an annular flange or spigot-ring corresponding in size and form with the aforesaid groove and adapted to fit into it. The rings are each cut transversely at one point, and thus can be expanded and contracted, the parts of cutting the two being arranged at diametrical points on the opposite sides of the complete ring, so that the cuts "break joint," and the rings are so made or provided with means that the said ring cannot expand or be pressed out beyond a certain amount, either by their natural elasticity or spring or by separate springs, if such springs be used, while at the same time up to this limit the ring as a whole has free play to spring outward, and yet the two rings exercise a mutual control and retard by the friction between them or by the adhesion of the annular rib and groove the outward expansion when pressed outward and produce a gentle yet effective outward pressure.

In one construction means for limiting the outward expansion of the rings, plugs, pins, or stops are provided in the grooved ring on opposite sides of the cut in same, and gaps are provided in the annular-flange or spigot ring, in which the stops will lie when the two rings are placed together, and thus these check the ring in its outward action.

When the two rings are together, with their separate points at which they are cut diametrically opposite each other, they interlock each other and form one ring, and in working they open approximately in a true circle.

Examples of rings according to the invention are illustrated in the annexed drawings.

In the drawings, Figure 1 is a transverse section at the points where the two rings are cut on the two opposite sides. Figs. 2 and 2$^A$ are sections of the two rings separated viewed at ninety degrees from that given in Fig. 1 and showing the means of limiting or checking the outward action of the ring; and Fig. 3 is a plan, partly in section, of the whole ring. Figs. 4, 4$^A$, 4$^B$ show a construction of ring suitable for air-pump buckets or piston-valves and the like.

Referring now to the drawings, and more particularly to Figs. 1 to 3, $a$ is the grooved ring, and $e$ the ring with the annular-flange ring. $b$ is the annular groove in the ring $a$, and $c$ represents the stop-pieces in this ring, one of which is disposed on each side of the gap $d$. These stops consist of T-headed plugs, the shanks of which fit in a recess cut in the inner wall of the ring inclosing the channel $b$. The flange $f$ of the ring $e$ corresponds in size and form substantially with the groove $b$ of ring $a$, and this flange $f$ is provided with gaps $g$, in which the plugs or stops $c$ of the ring $a$ will lie or fit when the rings $a$ and $e$ are together.

In use when the surface of the ring which rubs upon the cylinder or other surface with which it works has become worn to such an extent that the rings cease practically to bear or press it up with sufficient force to make a steam-tight joint the rings are taken out and apart and the stops $c$ are cut away or reduced on one side or the metal of the flange $f$ at the gaps $g$ is cut away at one side, so as to allow further outward expansion of the ring, and thereupon the rings $a$ and $e$ are again put together. Hence the condition required as to degree of pressure exerted by the rings and the behavior generally of the rings can be maintained continuously by this construction until the rings are completely worn out, and this adjustment obviously can be very easily and quickly made. Furthermore, if the natural spring of the rings does not produce the necessary outward pressure or has ceased to do so after certain wear this outward pressure is attained by the use of a spring $i$, introduced into the groove $b$ and adapted to press on the ends of the flange $f$ of the ring $e$, which, as will be seen in Fig. 3, are cut away on each side of the point at which this ring is cut. Otherwise the behavior of the ring will remain precisely as above described.

These rings can be used in a piston as single rings or in multiple, and they can be fitted and held in place in any known suitable way, and it will be plain they can be used in connection with or as piston-rings for piston-valve pistons, plungers, and the like and in stuffing-boxes. In the latter case, of course, the pressure on the rings will be adapted and arranged to be inward instead of outward.

The construction of ring shown in Figs. 4, 4$^A$, and 4$^B$, as above stated, is more particularly suitable for pump-buckets, piston-valves, and the like; but, if desired, it can be used in pistons. In this modification in lieu of there being two rings there are three, $a$, $e$, and $e'$, one, $e$, at one side of the ring $a$ and one, $e'$, at the other, and the ring $a$ has two grooves $b$, each adapted to receive the flange $f$ of the rings $e$ and $e'$. The rings $e$ and $e'$ are identical with each other and with the ring $e$, (shown in Figs. 1 to 3,) and the ring $a$ in this modification only differs from the ring $a$ in Figs. 1 to 3 in that it has a groove $b$ in both edges, while the action and behavior of the ring is precisely similar to that of the ring above described.

What is claimed is—

1. A packing-ring for making steam or fluid tight joints between two parts which have movement in relation to one another, comprising a plurality of cut rings, one, $a$, provided with a channel $b$, and the other made of T-section, the annular flange $f$ of which is adapted to fit in the groove $b$; and stops $c$ set in the ring $a$ and having a portion fitting in the channel $b$, and adapted to lie in gaps formed in the said annular flange $f$.

2. A packing-ring for making steam or fluid tight joints between two parts which have movement in relation to one another, comprising a plurality of cut rings, one, $a$, provided with an annular groove, and the other being adapted to fit in the said groove, and provided with expansion or contractile controlling or limiting means; and a spring $i$, adapted to press on the ends of the said inner ring or rings, which fit in the groove of the other ring; substantially as set forth.

In testimony whereof we have signed our names to this specification in the presence of two subscribing witnesses.

THOMAS READING.
ALFRED JOHN HOUGHTON.

Witnesses:
SOMERVILLE GOODALL,
GUY OKE.